June 27, 1939.  E. C. SMITH  2,163,987

GEM GRINDING MACHINE

Filed Aug. 31, 1937   2 Sheets-Sheet 1

INVENTOR.
Edward C. Smith
BY O O Martin
ATTORNEY.

Patented June 27, 1939

2,163,987

UNITED STATES PATENT OFFICE 2,163,987

GEM GRINDING MACHINE

Edward C. Smith, Santa Barbara, Calif.

Application August 31, 1937, Serial No. 161,811

6 Claims. (Cl. 51—101)

This invention relates to grinding machines and particularly to a machine for simultaneously grinding a number of objects to exactly the same shape.

It is the general object of the invention to provide a simple and efficient machine for shaping small objects, such as precious stones. It is an object to provide a machine in which successive series of such objects may be held and shaped exactly alike thereby quickly and economically to produce large quantities of such objects of uniform shape. A further object is the provision of means for quickly and accurately adjusting the machine to grind series of objects of a different size or shape. Another object is to provide means for steadying the objects during the grinding operation in order to make certain to eliminate vibrations and flexing of the supports for the objects being shaped.

Figure 1:
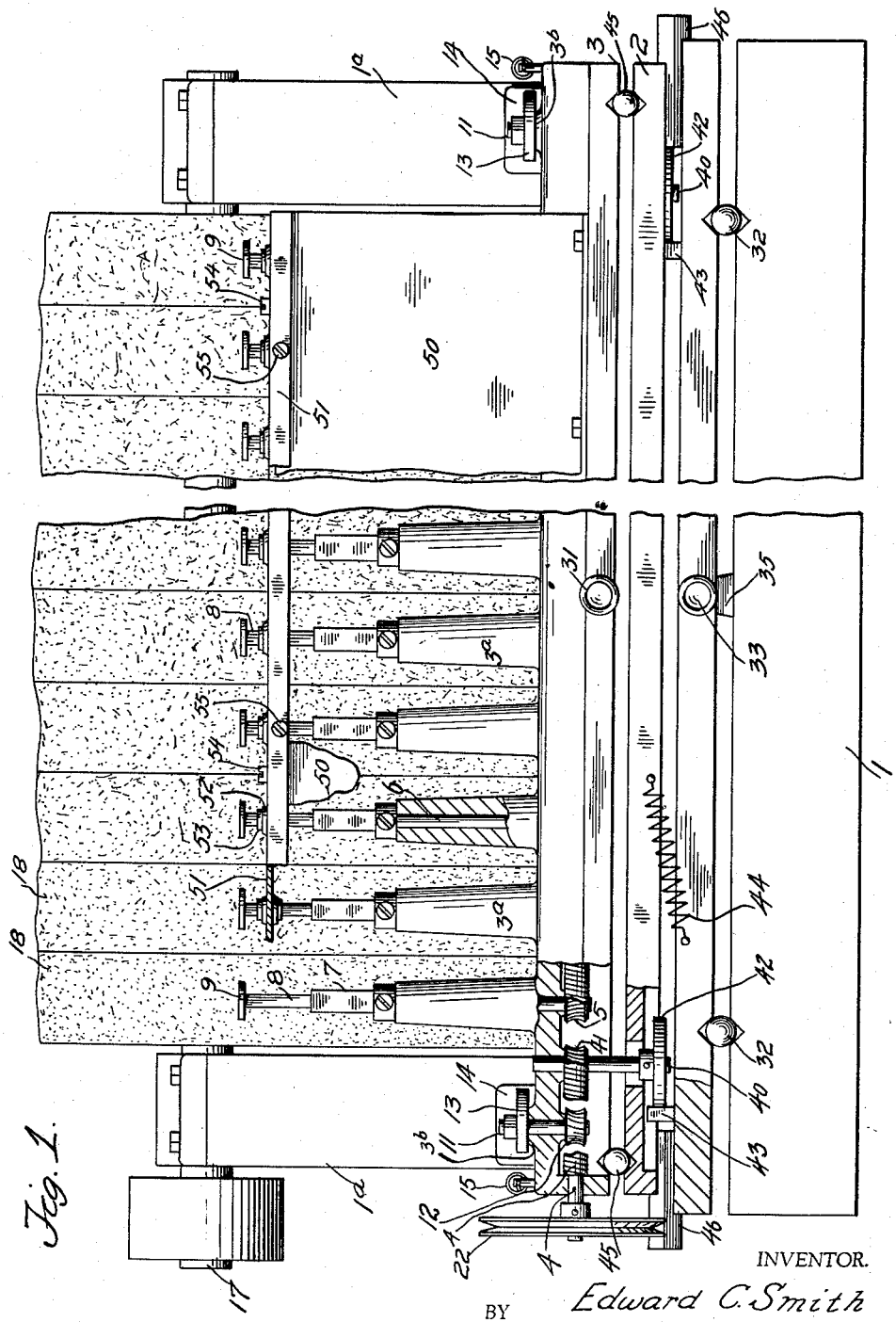
Figure 2:
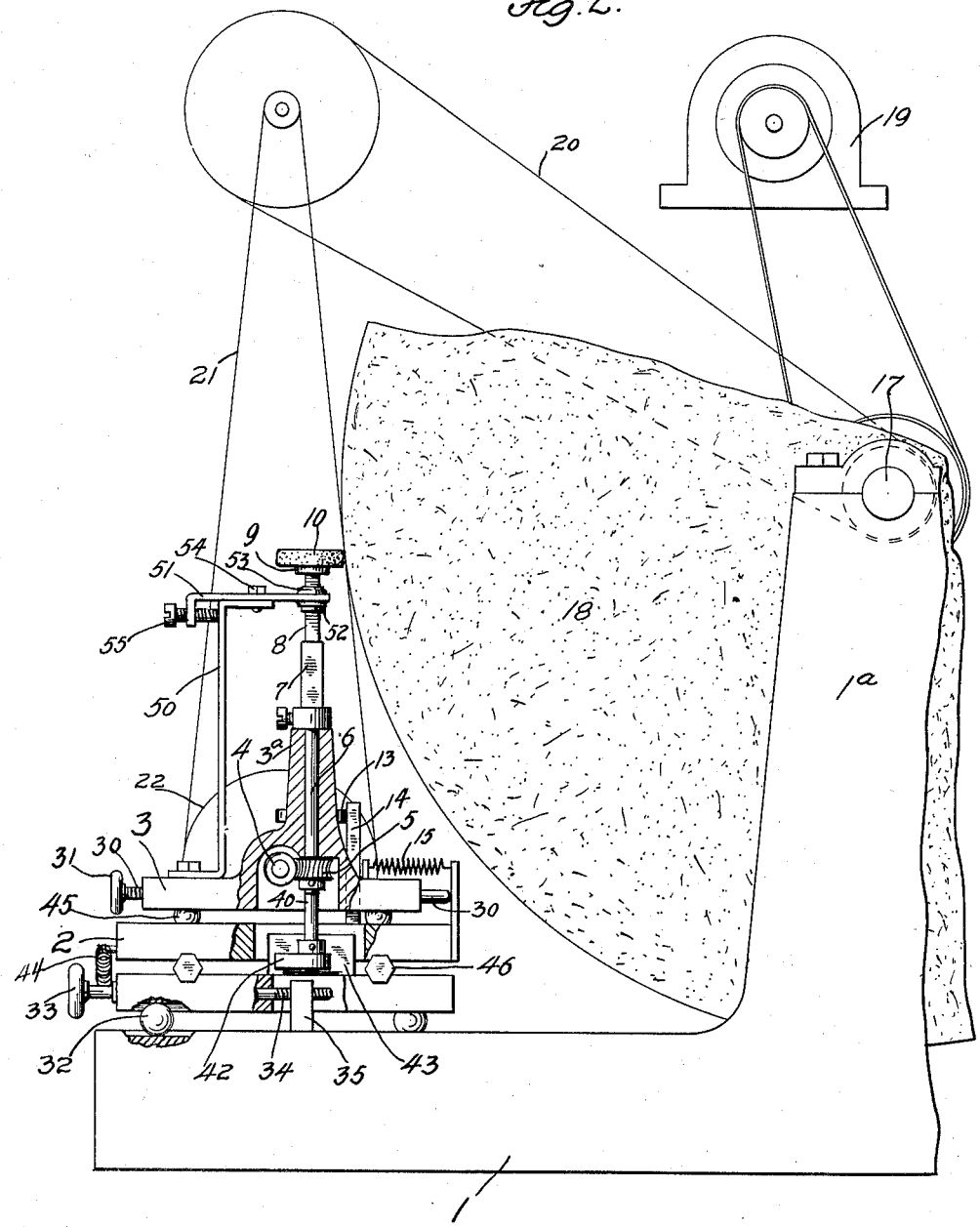

Other objects of the invention will become apparent upon perusal of the following description and examination of the accompanying drawings of which:

Fig. 1 is a front elevation of a device embodying the invention. Parts are broken away in order to disclose as much as possible of the interior mechanism of the device; and, Fig. 2 is a substantially corresponding end elevation of the device. Also in this view, parts are broken away in order better to illustrate some of the interior mechanisms of the device. Other parts, particularly the driving mechanism, which presents no novel features, are merely outlined in order not to obscure the more important parts of the invention.

The device of the invention, in the form illustrated in the drawings, comprises a base 1 on which a carriage 2 is mounted for lengthwise reciprocal movement in a manner which will be hereinafter fully explained. On the carriage 2 is mounted a subcarriage 3 for transverse reciprocations relative to the former, all as indicated in Fig. 1.

Extending lengthwise through the subcarriage 3 is a worm screw 4, in mesh with a series of worm wheels 5. The subcarriage is made with a series of vertically rising columnar projections 3ª, within which shafts 6 are seated to rotate. One of the worm wheels 5 is secured to the lower end of each of these shafts, the result being that the shafts 6 are rotated in response to rotations of the worm 4.

The shafts 6 are made with a square socket at the upper end, preferably by fastening a piece of square tubing 7 to the upper end of the shaft, and this tubing is of a size to receive a squared stem 8, terminating at the top in a plate 9. The stem and plate combine to form a support on which the rough stone 10 is placed and held in position by suitable cement, see also Fig. 2.

At the ends of the subframe, and in line with the standards 3ª, are found perforated bosses 3ᵇ in which short shafts 11 are seated to rotate. Wormwheels 12 are fastened to the lower end of these shafts and they are also positioned for rotation by the worm 4. The upper ends of the shafts 11 are shaped to receive templets 13 for contact with gages 14 of the carriage 2. Yielding means, such as springs 15, maintain the templets pressed against the said gages.

The base 1 is made with standards 1ª fitted at the top to receive a shaft 17 for the grinding wheel, or wheels, 18. A prime mover, such as an electric motor 19, is suitably connected to rotate the grinding wheel at the proper speed, and connections 20, 21, extending to a pulley 20, of the worm screw 4, indicate means of rotating the latter at a suitable slower speed.

The device, as above briefly described operates in the following manner. The stone supports 8, 9, with the stones cemented in place, are placed in position after the desired templets 13 first have been clamped in position. When now the prime mover is set in motion to rotate the grinding wheel, it is seen that the worm also is rotated and with it both the stone supports and the templets. It is also to be noted that the springs 15 urge the subcarriage forward, thereby to press the rough stones against the grinding wheel, until the templets attain continued contact with the gages 14 to relieve this pressure.

When this position is reached, it is found that all the stones have been ground to exactly the same shape.

The subcarriage is fitted with a screw 30, operable by a handwheel 31 to withdraw the subcarriage, and with it the ground stones, from the grinding wheel. The stone supports 8, 9 may then be withdrawn from their sockets and others reinserted, whereupon the handwheel 31 is slowly turned back to its initial position gradually to permit the springs 15 to draw the stones into contact with the grinding wheel. This operation is repeated until the required stones are ground.

Where a great number of stones are shaped at one setting of the templets, it is necessary to check the shape from time to time to make certain that wear of the grinding wheel does not affect the size of the finished stones.

Should such check indicate increase in size of the finished stones, it becomes necessary to move the whole device closer to the wheel. To this end, I have shown the device transversely movable on ball or roller bearings 32, and the transverse movement of the device is controlled by a handwheel 33, of a screw 34 which is shown threaded into a lug 35 of the base. Anyone versed in the art will appreciate that a slight rotation of this screw suffices to take up for any slight wear of the wheel, also that such adjustment in no wise affects the setting of the stones in the subcarriage 3.

In the drawings, a series of grinding wheels are shown to present a continuous, straight grinding surface across the entire length of the machine. It is important that this surface remain straight, as any groove in the wheels, due to wear, will affect the shape of the objects being ground. It was above stated that the carriage 2 is mounted on the base for lengthwise movement, and it is now seen that in thus reciprocating the carriage, the stones continuously travel back and forth across the surface of the grinding wheels to maintain this surface straight. In this manner, it is possible to maintain the grinding wheel in proper condition.

The mechanism required for this reciprocatory movement is here shown to comprise a shaft 40, see also Fig. 2, mounted in the subcarriage in line with the stone supports and having a worm gear 41 in mesh with the worm 4. A circular plate 42 is eccentrically mounted on the shaft 40, below the gear 41 for contact with a stationary plate 43. A spring 44 urges the cam into contact with the plate. But other suitable means may be substituted, if desired.

The objects to be shaped are often very small and must be carefully handled, for which reason it is necessary that the device be made very sensitive. To this end, I have shown the subcarriage 3 mounted on ball or roller bearings 45. The main carriage 2 may also be set on ball or roller bearings although ordinary gibs, such as shown at 46, should suffice for the lengthwise reciprocations, which do not directly affect the shaping of the stones.

Because the stone supports are very slender, it is advisable to provide means, close to the point of contact of the stones with the wheel, for guiding these supports, and such means is here shown to comprise a bracket 50, rising from the subcarriage 3 and fitted at the top to receive a transversely adjustable plate 51. In this plate is secured a series of bosses 52, in which a corresponding series of collars 53 are mounted to rotate, and the perforation through these collars is squared to receive the square stems 8 of the stone supports. When this guiding device is positioned as close to the plate 9 as possible, it is seen that vibrations of the stones, during the grinding operation, may be effectively checked.

The plate 51 is held in transversely adjusted position by means of a series of clamping screws 54, seated in transverse slots 53 (not shown) of the plate. The latter is shown L-shaped to accommodate a series of screws 55 provided for the purpose of facilitating fine adjustment of the position of the plate.

I claim:

1. A stone grinding device comprising, a base, a grinding wheel rotatable on said base, axially parallel stone supports, a carriage on the base for lengthwise reciprocations, a second carriage for transverse reciprocations on said first carriage, said second carriage having vertical columns integral therewith and shaped to receive said stone supports, means within said second carriage for rotating said stone supports axially, and means also within said second carriage and associated with said rotating means for effecting such lengthwise reciprocations during rotations of said stone supports.

2. A stone grinding device comprising, a base, a grinding wheel rotatable on said base, axially parallel stone supports, a carriage on the base for lengthwise reciprocations, a second carriage for transverse reciprocations on said first carriage, said second carriage having vertical columns integral therewith and shaped to receive said stone supports, means within said second carriage for rotating said stone supports axially, means yieldingly urging said second carriage towards the wheel, means associated with said rotating means for withdrawing said stone supports transversely against the tension of said yielding means while rotating to control the contour of the object ground, and means also within said second carriage and associated with said rotating means for effecting such lengthwise reciprocations during rotations of said stone supports.

3. A stone grinding device comprising, a base, a grinding wheel rotatable on said base, mechanism longitudinally and transversely movable on said base, axially parallel interchangeable stone supports rising from said mechanism and rotatable therein, means for rotating said supports in timed relation to the rotation of said grinding wheel, and means guiding said supports at the upper end to prevent vibrations due to pressure of said wheel against the objects held by the supports.

4. A stone grinding device comprising, a base, a grinding wheel rotatable on said base, mechanism longitudinally and transversely movable on said base, axially parallel interchangeable stone supports rising from said mechanism and rotatable therein, means for rotating said supports in timed relation to the rotation of said grinding wheel, and transversely adjustable means guiding said supports at the upper end to prevent vibrations due to pressure of said wheel against the objects held by the supports.

5. A base, a grinding wheel on said base, a series of axially parallel interchangeable supports for objects to be ground, devices fitted rotatably to receive said supports, means within said devices and operatively connected with said grinding wheel to rotate said supports, means associated with said rotating means for moving said supports away from and toward said wheel to determine the contour of the objects to be ground, and means for guiding said supports near the objects to be ground to prevent vibration of the objects being ground.

6. A stone grinding device comprising, a base, a grinding drum mounted for rotation on said base, a carriage transversely movable relative to said drum, means yieldingly urging said carriage towards the drum, said carriage being made with a series of columns vertically rising therefrom in a plane parallel with the drum axis, stone supports seatable in said columns, means within said columns for rotating said supports in timed relation to the drum rotations, means within carriage and associated with the said rotating means for moving said carriage against the tension of said yielding means, and cooperating means within the carriage for reciprocating said carriage lengthwise to move stones carried by said supports back and forth across the periphery of the drum.

EDWARD C. SMITH.